United States Patent [19]

Tanaka et al.

[11] Patent Number: 4,657,340
[45] Date of Patent: Apr. 14, 1987

[54] TERMINAL DEVICE FOR OPTICAL FIBERS

[75] Inventors: Toshiyasu Tanaka; Sadakazu Ariga, both of Yokohama, Japan

[73] Assignee: E. I. Du Pont de Nemours and Company, Wilmington, Del.

[21] Appl. No.: 683,519

[22] Filed: Dec. 19, 1984

[30] Foreign Application Priority Data

Dec. 27, 1983 [JP] Japan .................. 58-203334[U]

[51] Int. Cl.⁴ .............................................. G02B 6/36
[52] U.S. Cl. ................................................ 350/96.20
[58] Field of Search ................ 350/96.20, 96.21, 96.22

[56] References Cited

U.S. PATENT DOCUMENTS

| 3,947,088 | 3/1976 | French ............................ 350/96.2 |
| 4,217,028 | 8/1980 | Reh et al. ....................... 350/96.2 |
| 4,339,171 | 7/1982 | Makuch et al. ................. 350/96.2 |
| 4,362,356 | 12/1982 | Williams et al. ............... 350/96.2 |
| 4,373,777 | 2/1983 | Borsuk et al. .................. 350/96.2 |

FOREIGN PATENT DOCUMENTS

| 2096348 | 10/1982 | United Kingdom ............. 350/96.2 |
| 2124793 | 2/1984 | United Kingdom ............. 350/96.2 |

Primary Examiner—John Lee

[57] ABSTRACT

A terminal device for optical fibers is provided. The terminal device includes a connecting member for fixedly securing the covering of an optical fiber to a frame and having a hole through which the strand of the optical fiber can pass idly. The terminal device includes a positioning member for positioning in a predetermined positional relationship a plurality of ferrules disposed at the end portions of a plurality of optical fibers. The terminal device includes a guide member for guiding an optical fiber within the device in such a manner as to permit its movement only in its axial direction.

15 Claims, 5 Drawing Figures

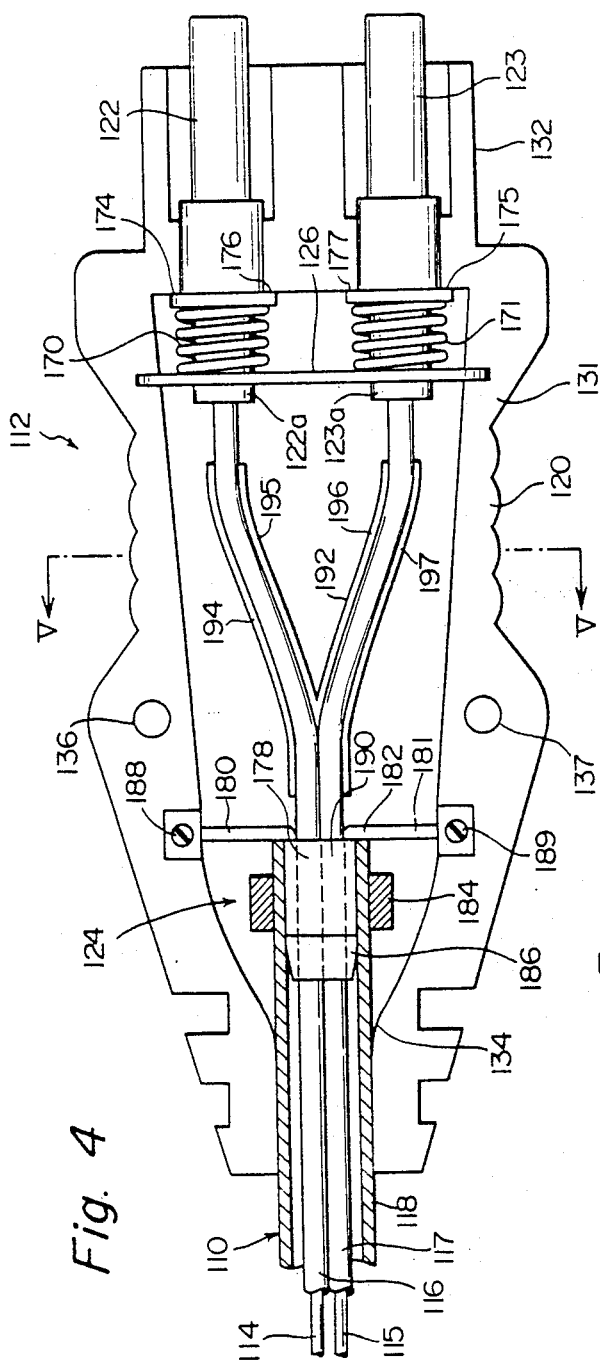
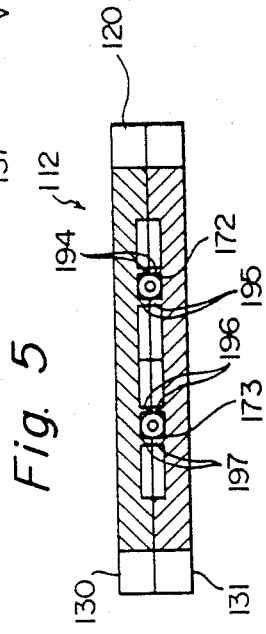
Fig. 4
Fig. 5

TERMINAL DEVICE FOR OPTICAL FIBERS

BACKGROUND OF THE INVENTION

1. Field of the Invention

This invention relates to a terminal device for optical fibers such as a connector plug and a connector receptacle.

More specifically, this invention relates to a terminal device for optical fibers which is provided with ferrules to be connected to the end portions of optical fibers and includes a mechanism for preventing damage, for example breakage, of the optical fibers and also avoiding a decrease in light transmittance which may be caused by bending of the optical fibers.

2. Description of the Prior Art

In a conventional terminal device for optical fibers, the end portions of the optical fibers are connected to ferrules provided in the terminal device.

The conventional device, however, has the following problems to be solved.

In detaching two connected terminal devices, for example a connector plug and a connector receptacle, it is frequently the practice to grasp optical fibers instead of the frames of these devices. The pulling force exerted on the optical fibers in this case may act on both the strands and coverings of the optical fibers and result in breakage of the strands, or may result in improper positioning of the strands in the terminal devices.

Furthermore, it sometimes happens that the strands stretch owing to thermal expansion and a force is generated to push the strands into the inward portions of the terminal devices. It has been proposed on the other hand to provide ferrules elastically with respect to frames in order to ensure intimate connection of the optical fibers in an optical fiber connector. In such a case, the excessive lengths of strands exist within the terminal devices and consequently the strands are bent. Bending of the strands undesirably causes a decrease in the light transmittance of the optical fibers.

As information transmitting systems become complex, necessity arises to mount and detach a plurality of optical fibers on and from various devices. If in such a case the optical fibers are mounted and detached independently from each other, the mounting and detaching operations become complex, and moreover, the lengths of the plurality of optical fibers become non-uniform. As a result, the load will be concentrated on a specific optical fiber and may break it.

SUMMARY OF THE INVENTION

It is an object of this invention to provide a terminal device for optical fibers which prevents the exertion of an excessive pulling load on the strands of the optical fibers and therefore avoids their breakage.

Another object of this invention is to provide a terminal device for optical fibers in which the strands of the optical fibers are scarcely bent, and therefore their light transmittance does not appreciably decrease.

The above and other objects of this invention will become apparent from the following description.

According to this invention, the above and other objects are achieved by providing a terminal device for an optical fiber, comprising a ferrule disposed at the end portion of the optical fiber, a frame supporting the ferrule, and a connecting member for fixedly securing the covering of the optical fiber to the frame, said connecting member having a hole through which the strand of the optical fiber can pass idly.

According to this invention, the above and other objects are also achieved by providing a terminal device for a plurality of optical fibers, comprising a plurality of ferrules disposed at the end portions of a plurality of optical fibers, a positioning member for positioning the ferrules in a predetermined positional relationship, and a fixing member for fixing the ferrules to the positioning member.

Furthermore, according to this invention, the above and other objects are achieved by providing a terminal device for an optical fiber, comprising a ferrule fixed to the end portion of the strand of an optical fiber, a frame supporting the ferrule, and a guide member for guiding that portion of the optical fiber which extends from the inside end of the ferrule to the exit portion of the frame such that said portion of the optical fiber can move only substantially axially thereof.

BRIEF DESCRIPTION OF THE ACCOMPANYING DRAWINGS

The above and other objects are acccomplished by the novel features of the present invention which will become apparent from the following description having reference to the accompanying drawings wherein:

FIG. 4 is a partly sectional top plan view of an optical fiber connector plug in accordance with a second embodiment of the invention with a portion thereof removed; and FIG. 5 is a sectional view taken along line V—V of FIG. 4.

DETAILED DESCRIPTION OF PREFERRED EMBODIMENTS

Figure 1:
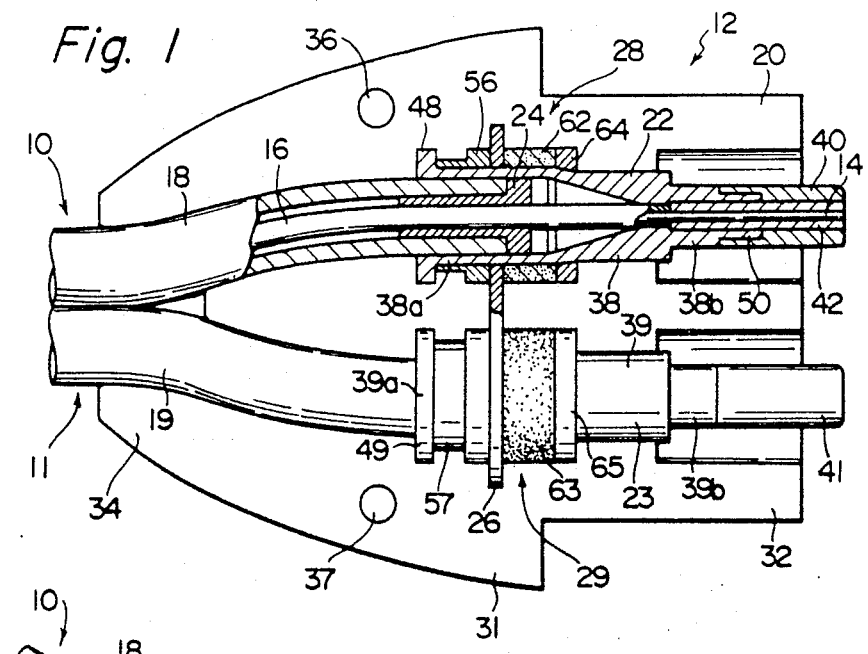
FIG. 1 is a partly sectional top plan view of an optical fiber connector plug in accordance with a first embodiment of the invention with a portion thereof removed.
Figure 2:
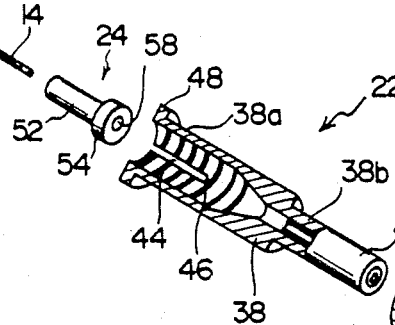
FIG. 2 is an exploded view of the principal portions of the optical fiber connector plug of FIG. 1.

First, with reference to FIGS. 1 to 3, the first embodiment of this invention will be described.

In this embodiment, a connector plug 12 for two optical fibers 10 and 11 is shown.

Each of the optical fibers 10 and 11 is comprised of a strand 14 composed of a core and a cladding layer, an interior sheath portion 16 covering the strand 14 in loose fit and an exterior sheath portion 18 covering the interior sheath portion 16 in loose fit.

The connector plug 12 has a frame 20, two ferrules 22 and 23, a connecting member 24 for connecting the exterior sheath portions 18 and 19 of the optical fibers 10 and 11 respectively to the ferrules 22 and 23, a positioning member 26 for positioning the two ferrules 22 and 23 in a predetermined positional relationship, and a fixing member 28 for fixing the ferrules 22 and 23 to the positioning member 26.

Figure 3:
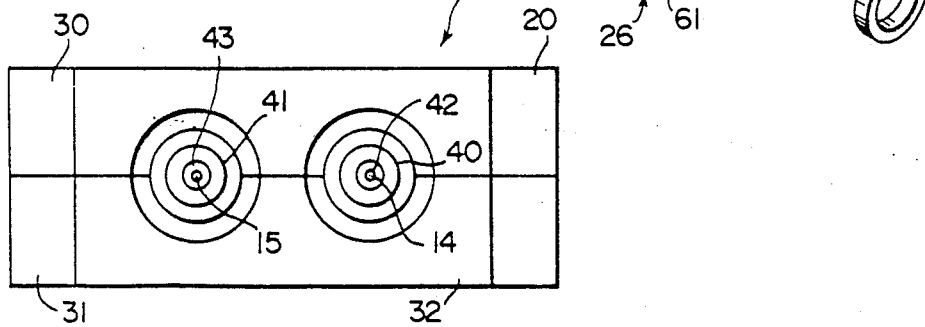
FIG. 3 is a side elevation of the optical fiber connector plug of FIG. 1.

The frame 20 is comprised of two portions 30 and 31 having the same shape as shown in FIG. 3. The frame 20 includes an end portion 32 to be connected to a member to be mated with the connector plug 12, for example an optical fiber connector receptacle (not shown), and an exit portion 34 from which the optical fibers 10 and 11 come out of the connector plug 12. The two portions 30 and 31 of the frame 20 are connected, for example, by two sets of bolts and nuts (not shown) set through holes 36 and 37.

The ferrules 22 and 23 are comprised respectively of ferrule bodies 38 and 39, forward end collars 40 and 41 and strand holding pipes 42 and 43. The base end sides 38a and 39a of the ferrule bodies 38 and 39 have larger inside and outside diameters than their forward end sides 38b and 39b respectively. Furthermore, a plurality of slits 44 are formed on the base end sides 38a and 39a and their diameters can be reduced by the force acting in the inward direction. A circumferentially extending channel 46 is formed on the inner circumferential surfaces of the base end sides 38a and 39a of the ferrule bodies 38 and 39 so as to avoid easy detachment of the connecting member 24 and the exterior sheath portions 18 and 19 of the optical fibers 10 and 11 from the ferrule bodies 38 and 39. Flanges 48 and 49 are formed at the distal ends of the base end sides 38a and 39a of the ferrule bodies 38 and 39. These flanges serve to position the ferrules 22 and 23 with respect to the positioning member 26. The strands 14 and 15 at the forward ends of the optical fibers 10 and 11, respectively, from which the exterior sheath portions 18 and 19 and interior sheath portions 16 have been removed are disposed in strand holding pipes 42 and 43 for centering. The strand holding pipes 42 and 43 are fitted tightly in the small inside diameter portions of the forward end collars 40 and 41, and the small outside diameter portions 50 of the forward end portions of the ferrule bodies 38 and 39 are fitted tightly in the large inside diameter portions of the forward end collars 40 and 41. As a result, the forward ends of the strands 14 and 15 of the optical fibers 10 and 11 are fixedly disposed in the ferrule bodies 38 and 39.

The connecting member 24 has a main portion 52 having a nearly cylindrical shape and a flange portion 54 formed at one end thereof. The flange portion 54 has an outside diameter nearly equal to the inside diameter of each of the base end side 38a and 39a of the ferrule bodies 38 and 39. As will be described hereinbelow, when the inside diameters of the base end sides 38a and 39a of the fetrule bodies 38 and 39 are reduced by base end collars 56 and 57, etc., the flange portions 54 are fixed to the ferrule bodies 38 and 39. The exterior sheath portions 18 and 19 of the optical fibers 10 and 11 are disposed between the main portion 52 of the connecting member and the base end sides 38a and 39a of the ferrule bodies 38 and 39, and by the reduction of the inside diameters of the base end portions 38a and 39a, the exterior sheath portions 18 and 19 are connected to the ferrule bodies 38 and 39. A central hole 58 is formed in the connecting member 24, and the strands 14 and 15 and the interior sheath portions 16 of the optical fibers 10 and 11 pass through the central hole 58. The connecting member 24 has sufficient rigidity and its central hole 58 has a slightly larger outside diameter than the interior sheath portion 16, whereby the force exerted on the exterior sheath portions 18 and 19 of the optical fibers 10 and 11 and the main portion 52 of the connecting member 24 from the ferrule bodies 38 and 39 does not act on the interior sheath portions 16 and the strands 14 and 15 of the optical fibers 10 and 11.

The positioning member 26 is formed as a nearly elliptical plate-like unit having two circular holes 60 and 61 having inside diameters nearly equal to the outside diameter of the main bodies 38 and 39 of the ferrules 22 and 23. As will be described hereinbelow, the ferrules 22 and 23 are fixed to the positioning member 26 by the fixing members 28 and 29 while they extend through the circular holes 60 and 61 of the positioning member 26. As a result, the two ferrules 22 and 23 are fixedly positioned in a predetermined positional relationship.

The fixing members 28 and 29 consist respectively of base end collars 56 and 57, cushioning members 62 and 63 and holding collars 64 and 65. The base end collars 56 and 57 have inside diameters slightly smaller than the outside diameters of the base end sides 38a and 39a of the ferrule bodies 38 and 39, and are passed over the ferrule bodies 38 and 39 from the forward end sides 38b and 39b and engaged respectively with the peripheries of the base end sides 38a and 39a in tight fit. Thus, the collars 56 and 57 are held at positions at which they make contact with the flanges 48 and 49 of the ferrule bodies 38 and 39. The base end collars 56 and 57 reduce the outside diameters of the base end sides 38a and 39a to fix the exterior sheath portions 18 and 19 of the optical fibers 10 and 11 to the ferrule bodies 38 and 39, respectively. The cushioning members 62 and 63 are formed of an elastic material such as rubber and received around the peripheries of the base end sides 38a and 39a of the ferrule bodies 38 and 39 in tight fit in a manner to interpose the positioning member 26 between the base end collars 56 and 57. The holding collars 64 and 65 have ri9idity as do the base end collars 56 and 57. They have slightly smaller inside diameters than the outside diameters of the base end sides 38a and 39a of the ferrule bodies 38 and 39 and engage the peripheries of the ferrule bodies 38 and 39 respectively in tight fit in such a manner as to push the cushioning members 62 and 63 towards the base end sides 38a and 39a respectively. In this manner, the two ferrules 22 and 23 are fixedly positioned in a predetermined positional relationship by the positioning member 26 and the fixing members 28 and 29.

The connector plug 12 in accordance with the first embodiment described above can be assembled as follows. First, at the end portions of the optical fibers 10 and 11, the exterior sheath portions 18 and 19 and the interior sheath portion 16 are partly cut off in a stepped form, and the nearly cylindrical main portion 52 of the connecting member 24 is inserted between the exterior sheath portion 18 or 19 and the interior sheath portion 16 from the end portion of the exterior sheath portion 18 or 19. On the other hand, the strand holding pipes 42 and 43 for performing centering of the strands 14 and 15 are forced into the forward end sides 38b and 39b of the ferrules 22 and 23, and thereafter, the forward end collars 40 and 41 are brought into tight engagement with the small diameter portions 50 of the ferrule bodies 38 and 39 and the strand holding pipes 42 and 43. Then, the end portions of the optical fibers 10 and 11 are inserted into the ferrules up to the desired positions from the base end sides 38a and 39a of the ferrule bodies 38 and 39 and positioned such that the strands 14 and 15 are held by the strand holding pipes 42 and 43 and the end portions of the exterior sheath portions 18 and 19 in which the connecting member 24 is inserted are disposed in the base end sides 38a and 39a of the ferrule bodies 38 and 39. If required, the strands 14 and 15 of the optical fibers 10 and 11 may be fixed to the inner walls of the holding pipes 42 and 43 by means of an adhesive. The base end collars 56 and 57 are passed over the forward end sides 38b and 39b and engaged tightly with the base end sides 38a and 39a. Thus, the diameters of the base end sides 38a and 39a are reduced and the exterior sheath portions 18 and 19 of the optical fibers 10 and 11 and the connecting member 24 are fixed to the ferrule bodies 38 and 39.

Subsequently, the positioning member 26 is passed over the forward end collars 40 and 41 of the ferrules 22 and 23 and engaged tightly with the base end sides 38a and 39a of the ferrule bodies 38 and 39 while being in contact with the base end collars 56 and 57. Likewise, the cushioning members 62 and the holding collars 64 and 65 are successively engaged tightly with the ferrule bodies 38 and 39. As a result, the positioning member 26 maintains the two ferrules 22 and 23 and the end portions of the two optical fibers 10 and 11 in a predetermined positional relationship.

Then, the two ferrules 22 and 23 connected by the positioning member 26 are received in the depressed parts of the two portions 30 and 31 of the frame 20 which have a shape conforming to the shape of the ferrules. The two portions 30 and 31 are then connected by two sets of bolts and nuts (not shown).

It is also possible to assemble the connector plug 12 as follows by making the inside diameters of the forward end collars 40 and 41 partly smaller than the outside diameters of the strand holding pipes 42 and 43. As stated above, the exterior sheath portions 18 and 19 and the interior sheath portion 16 are partly cut off in a stepped form, and the main portion 52 of the connecting member 24 is inserted between the exterior sheath portions 18 and 19 and the interior sheath portions 16, respectively. On the other hand, the strand holding pipes 42 and 43 are forced into the forward end sides 38b and 39b of the ferrules 22 and 23. Then, the end portions of the optical fibers 10 and 11 are inserted into the ferrules up to the desired positions from the base end sides 38a and 39a of the ferrule bodies 38 and 39. Thereafter, the forward end collars 40 and 41 are brought into tight engagement with the small diameter portions 50 of the ferrule bodies 38 and 39 and the strand holding pipes 42 and 43 to reduce the inside diameters of the strand holding pipes 42 and 43 slightly. By this procedure, the strands 14 and 15 of the optical fibers 10 and 11 can be fixedly disposed in the ferrule bodies 38 and 39.

The second embodiment of the present invention will now be described with reference to FIGS. 4 and 5.

An optical fiber shown at 110 in FIGS. 4 and 5 is comprised of strands 114 and 115, interior sheath portions 116 and 117 and one exterior portion 118 covering them. A connector plug 112 includes a frame 120, two ferrules 122 and 123, a connecting member 124 for connecting the exterior sheath portion 118 of the optical fiber 110 to the frame 120, a positioning member 126 for positioning the two ferrules 122 and 123 in a predetermined positional relationship, and elastic members, i.e. coil springs 170 and 171, disposed between the positioning members 126 and the two ferrules 122 and 123, respectively.

The frame 120, as shown in FIG. 5, is comprised of two portions 130 and 131 of the same shape. The frame 120 includes a forward end portion 132 to be inserted into, and connected to, a mating device which is, for example, an optical connector receptacle, and an exit portion 134 from which the optical fiber 110 comes out of the connector plug 120. The two portions 130 and 131 of the frame 120 are connected, for example, by means of two sets of bolts and nuts (not shown) to be set through holes 136 and 137.

The ferrules 122 and 123 are disposed in holes 172 and 173 provided in the frame 120 so that they can move axially thereof (in the left-right direction in FIG. 4).

The rear end portions 122a and 123a of the ferrules 122 and 123 extend through openings (not shown) provided in a positioning member, i.e. a plate member 126, fixed to the frame 120. The coil springs 170 and 171 are disposed respectively between the plate member 126 and the flange portions 174 and 175 of the ferrules 122 and 123 to urge the ferrules 122 and 123 in the forward end direction (to the right in FIG. 4). The flange portions 174 and 175 of the ferrules 122 and 123 engage the shoulder portions 176 and 177 of the frame 120 to hold the ferrules 122 and 123 elastically at the positions shown in FIG. 4. By the force acting inwardly (to the left in FIG. 4) on the ferrules 122 and 123, the ferrules 122 and 123 can move slightly inwardly.

The forward end portion of the optical fiber 110 is fixed to the ferrules 122 and 123. For example, only the strands 114 and 115 extend to the extreme ends of the ferrules 122 and 123 and the interior sheath portions 116 and 117 are cut so that they terminate in the ferrules 122 and 123. They are fixed to the ferrules 122 and 123 by, for example, an adhesive.

The exterior sheath portion 118 of the optical fiber 110 is connected to the frame 120 by the connecting member 124. The connecting member 124 is comprised of a fixed piece 182 composed of a nearly cylindrical main body 178 and two leg portions 180 and 181 fixed to the main body 178, and an annular clamp collar 184 disposed around the nearly cylindrical main body 178. The end portion of the exterior sheath portion 118 of the optical fiber 110 is disposed on the periphery of the nearly cylindrical main body 178 beyond the wedge-shaped raised portion 186 of the nearly cylindrical main body 178, and the clamp collar 184 is provided outside the exterior sheath portion 118. The clamp collar 184 clamps the end portion of the exterior sheath portion 118 inwardly, whereby the exterior sheath portion 118 is connected to the fixed piece 182. The two leg portions 180 and 181 of the fixed piece 182 are fixed to the frame 120 by screws 188 and 189. The nearly cylindrical main body 178 has an inner hole 190 through which the strands 114 and 115 protected by the two interior sheath portions 116 and 117 extend. The inner hole 190 is, for example, a hole having a circular cross section with a diameter nearly equal to the sum of the outside diameters of the interior sheath portions 116 and 117. As a result, the strands 114 and 115 protected by the inerior sheath portions 116 and 117 can move axially (in the left-right direction in FIG. 4) within the inner hole 190.

A guide member 192 is provided on the inside surface of the frame 120 between the connecting member 124 and the ferrules 122 and 123. The guide member 192 has a nearly rectangular cross section and is comprised of projecting portions 194, 195, 196 and 197 which are bent so that they guide the strands 114 and 115 protected by the interior sheath portions 116 and 117 between the connecting member 124 and ferrules 122 and 123. The projecting portions 194 and 195 and the projecting portions 196 and 197, respectively, form a guide hole having a nearly square sectional shape. The projecting portions 194, 195, 196 and 197 are sized such that the square makes contact with the periphery of each of the interior sheath portions 116 and 117. The sectional shape of the guide holes formed by the projecting portions 194, 195, 196 and 197 needs not always be nearly square as above, and it may be of a circular shape having a diameter nearly equal to the outside diameter of each of the interior sheath portions 116 and 117.

The device in accordance with this embodiment operates as follows.

When the ferrules 122 and 123 move inwardly, the strands 114 and 115 protected by the interior sheath portions 116 and 117 move only in the substantially bent axial direction of the guide member 192, and not in other directions. For this reason, the strands 114 and 115 are prevented from being further bent and decreased in light transmittance. When the ferrules 122 and 124 move inwardly, the strands 114 and 115 protected by the interior sheath portions 116 and 117 are guided mainly by the outside projecting portions 194 and 197 of the guide member 192. Accordingly, if it is desired to prevent bending of the strands 114 and 115 when the ferrules 122 and 123 move inwardly under predetermined conditions, it is sufficient to provide only the outside projecting portions 194 and 197.

On the other hand, when the strands 114 and 115 protected by the interior sheath portions 116 and 117 are pressed inwardly from the exit portion 134, they are guided mainly by the inside projecting portions 195 and 196 of the guide member 192. Accordingly, by providing the guide member 192 described above, the strands 114 and 115 are not further bent even when inwardly pressed. Consequently, the decrease in the light transmittance of the optical fiber attributed to its bending can be prevented.

What is claimed is:

1. A terminal device for a plurality of optical fibers, each fiber having a strand composed of a core and cladding layer, and a sheath surrounding each strand, said terminal device comprising:
   a plurality of ferrules, each disposed at one end of each optical fiber,
   a positioning member for positioning the ferrules in a predetermined positional relationship, and
   a fixing member for fixing the ferrules to the positioning member, said fixing member including a first collar engaging a flange provided at one end of each ferrule and a second collar engaging each ferrule to press the positioning member against the first collar.

2. The terminal device of claim 1 wherein the strand at said one end of each optical fiber is fixed to a forward end portion of the ferrule, and the sheath at said one end of each optical fiber is connected to a base end of the ferrule.

3. The terminal device of claim 1, further comprising a frame supporting the ferrules and a connecting member for securing the sheath of each optical fiber to its respective ferrule.

4. The terminal device of claim 3 wherein the ferrules are fixedly supported by the frame.

5. The terminal device of claim 3 wherein the ferrules are movably supported by the frame.

6. The terminal device of claim 5 wherein the ferrules are elastically supported by the frame.

7. The terminal device of claim 3 wherein the sheath of each optical fiber is fixedly connected to each respective ferrule by the connecting member, and each ferrule is fixed to the frame.

8. The terminal device of claim 3 wherein the sheath of each optical fiber is directly fixed to the frame by the connecting member.

9. The terminal device of claim 3 wherein the sheath of each optical fiber comprises an interior sheath portion and an exterior sheath portion; the exterior sheath portion is fixed to the frame by the connecting member; and the strand and the interior sheath portion extend through a hole of the connecting member.

10. The terminal device of claim 1 which is a connector plug for optical fibers.

11. The terminal device of claim 1 which is a connector receptacle for optical fibers.

12. The terminal device of claim 1 wherein the positioning member has a plurality of holes having inside diameters nearly equal to the outside diameters of the ferrules, and the ferrules are respectively fitted in the holes whereby the ferrules are positioned in the predetermined positional relationship.

13. The terminal device of claim 1 wherein the fixing member has an elastic member disposed between the positioning member and the second collar.

14. A terminal device for a plurality of optical fibers, comprising:
    a plurality of ferrules, each disposed at one end of each optical fiber,
    a frame supporting the ferrules,
    a positioning member for positioning the ferrules in a predetermined positional relationship;
    spring means biased against said positioning member whereby the ferrules are movably supported by the frame, and
    a guide member provided on an inner surface of the frame for guiding a portion of each optical fiber extending from its respective ferrule to an exit end of the frame so that said portion of the optical fiber moves only in substantially the axial direction of said guide member.

15. The device of claim 14 wherein each optical fiber comprises a strand, an interior sheath portion and an exterior sheath portion, the strand and the interior sheath portion being fixed to the respective ferrule and the exterior sheath portion being fixed to the frame, and the guide member guiding only the strand and the interior sheath portion.

* * * * *